United States Patent
Lawrence et al.

[15] 3,643,427
[45] Feb. 22, 1972

[54] FUEL CONTROL SYSTEMS FOR SUPPLYING FUEL TO PRIMARY AND MAIN BURNERS IN A GAS TURBINE ENGINE

[72] Inventors: Owen Napier Lawrence, Boxford, near Newbury; Eugene Harold Warne, Solihull, both of England

[73] Assignee: Joseph Lucas (Industries) Limited, Birmingham, England

[22] Filed: Aug. 22, 1969

[21] Appl. No.: 852,386

Related U.S. Application Data

[63] Continuation-in-part of Ser. No. 624,016, Mar. 17, 1967, abandoned.

[52] U.S. Cl..............................................60/39.28
[51] Int. Cl. ..........................................F02c 9/04
[58] Field of Search.................60/39.28, 241, 243, 226, 261

[56] References Cited

UNITED STATES PATENTS

| | | |
|---|---|---|
| 2,636,553 | 4/1953 | Ballantine................................60/243 |
| 2,988,883 | 6/1961 | Corbett................................60/39.28 |
| 3,000,436 | 9/1961 | Lawrence...............................60/243 |
| 3,067,576 | 12/1962 | Campbell................................60/241 |
| 3,095,702 | 7/1963 | Brown................................60/39.28 |
| 3,234,730 | 2/1966 | Deitweiler................................60/39.28 |
| 3,243,955 | 4/1966 | Frank................................60/243 |
| 3,280,560 | 10/1966 | Marchant................................60/226 |
| 3,338,051 | 8/1967 | Chamberlin................................60/226 |

Primary Examiner—Laurence M. Goodridge
Attorney—Holman & Stern

[57] ABSTRACT

Fuel control systems for supplying fuel to the primary and main burners in gas turbine engines of the fan-type in which means are provided for controlling the primary fuel supply in accordance with the engine compressor pressures. A variable operator control valve is utilized for supplying fuel to the main burner and means are included to maintain the flow rate to the main burners as a function of that of the primary burners.

4 Claims, 4 Drawing Figures

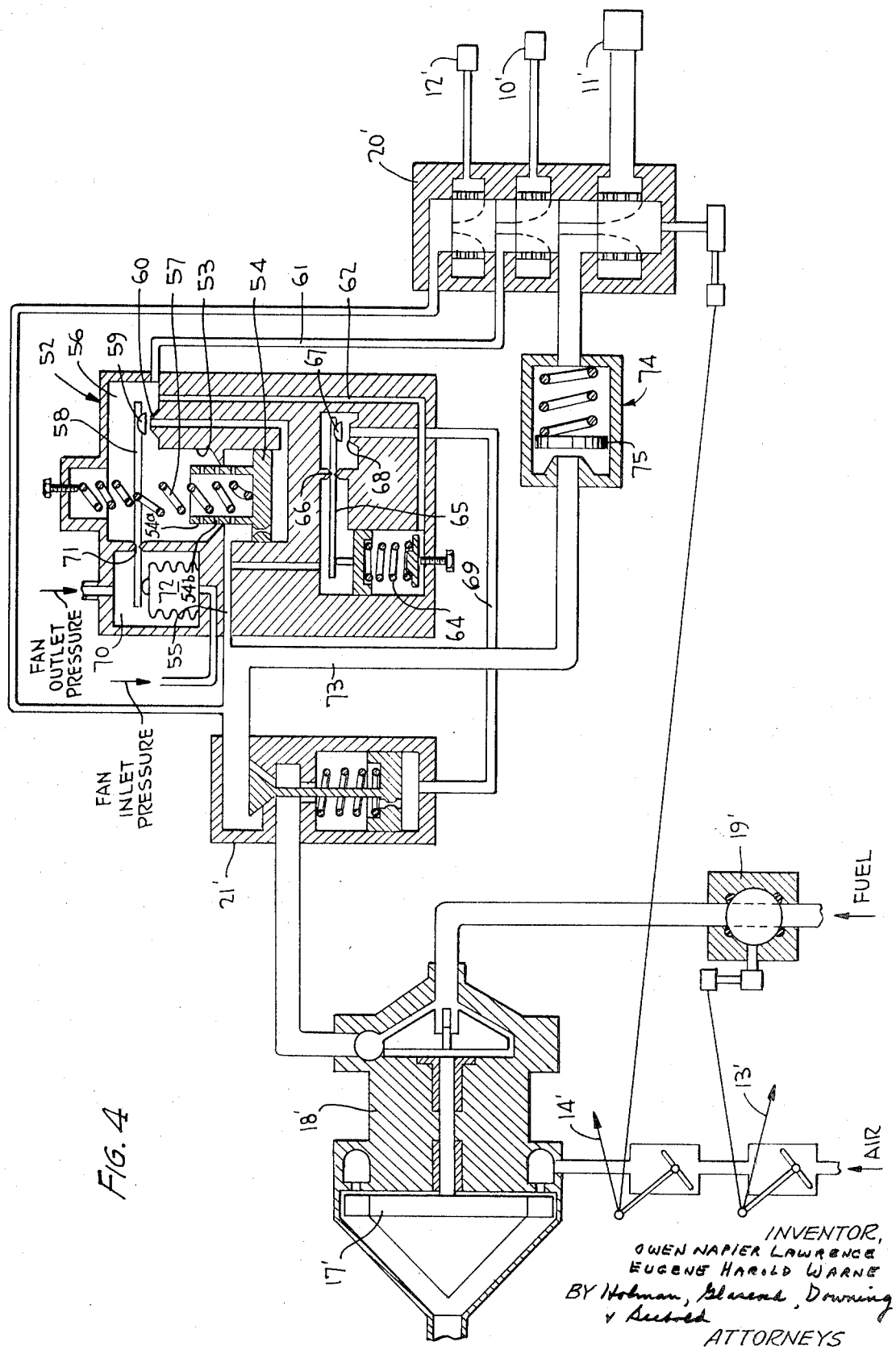

3,643,427

FUEL CONTROL SYSTEMS FOR SUPPLYING FUEL TO PRIMARY AND MAIN BURNERS IN A GAS TURBINE ENGINE

BACKGROUND OF THE INVENTION

This application is a continuation-in-part of our copending application Ser. No. 624,016 filed Mar. 17, 1967 and entitled FUEL CONTROL SYSTEMS FOR GAS TURBINE ENGINES, now abandoned.

The present invention relates to fuel control systems for use in gas turbine engines and more particularly of the type for supplying fuel to sets of primary and main burners.

SUMMARY OF THE INVENTION

The primary object of the invention is to provide fuel control systems for supplying fuel to the primary and main burners in a gas turbine engine of the fan type in which there is means for controlling the fuel supply to the primary burners in accordance with changes in a predetermined parameter, a variable operator control valve to control the fuel supply to the main burners, and means to maintain the flow rate to the main burners as a function of the flow rate to the primary burners.

Further important advantages of the invention will become more readily apparent to persons skilled in the art from the following detailed specification and annexed drawings and in which drawings.

BRIEF DESCRIPTION OF THE FIGURES

FIG. 4 is a diagrammatic view of the fuel system utilized in the apparatus in FIG. 3.

DETAILED DESCRIPTION OF THE INVENTION

Figure 1:
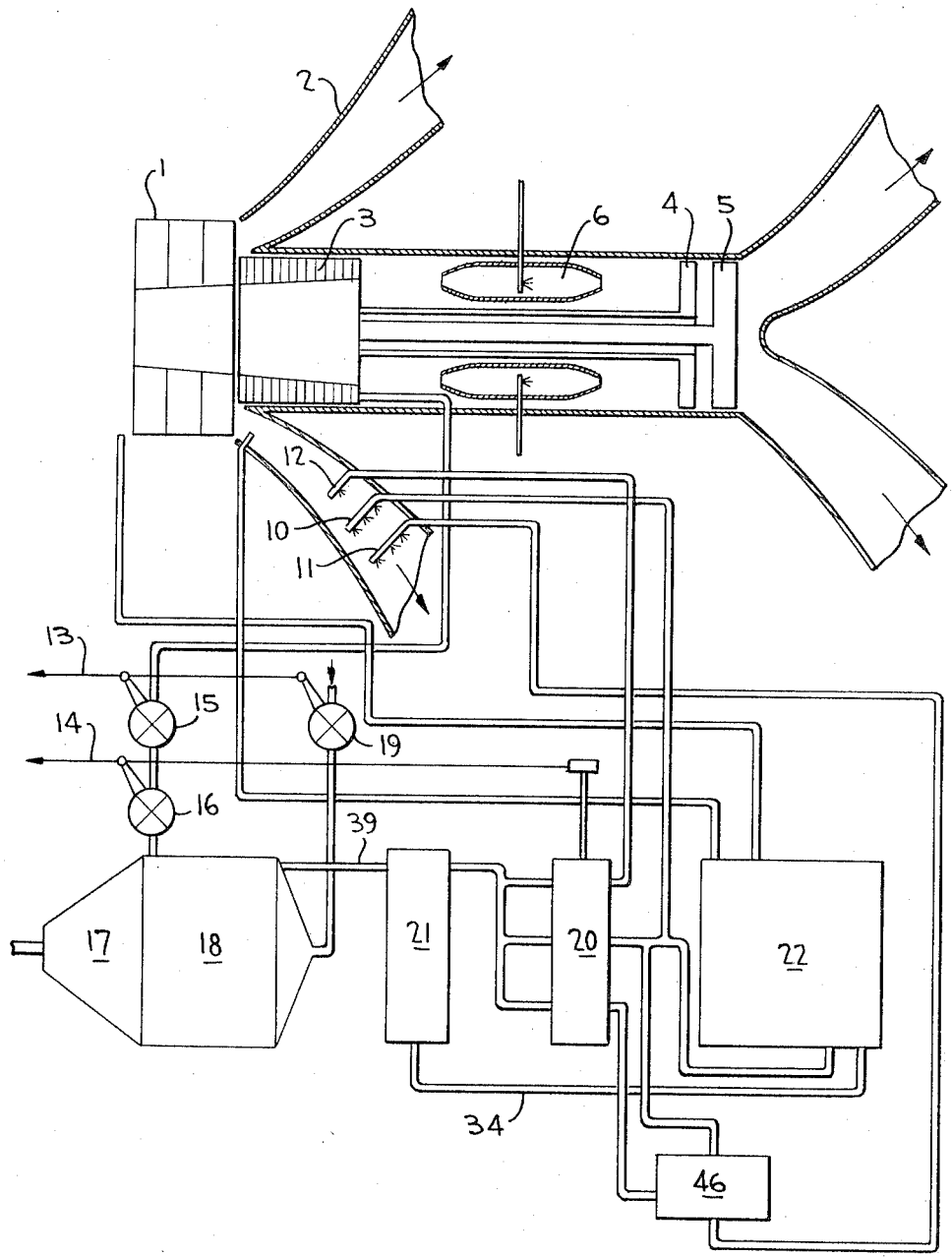
FIG. 1 is a diagrammatic view of a gas turbine engine of the fan type equipped with an auxiliary fuel control system embodying the present invention.
Figure 2:
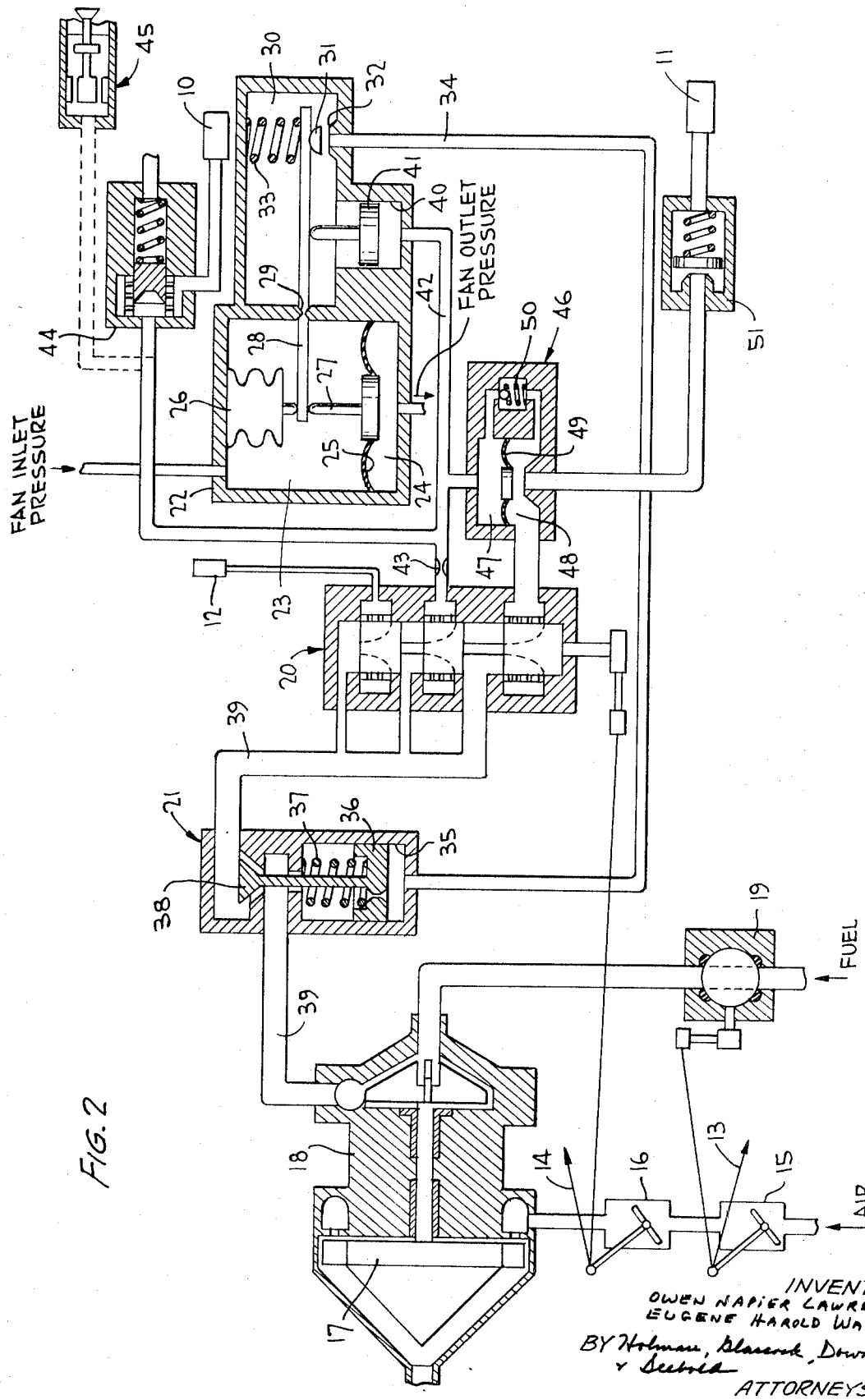
FIG. 2 is a diagrammatic view of the fuel system associated with the apparatus illustrated in FIG. 1.

While the two embodiments accomplish the same results, in the system illustrated in FIGS. 1 and 2 the principle of the control is that the pressure of the fuel flowing to the primary burners is controlled in accordance with the fan inlet and the rise in the outlet pressure. In other words, the pressures existing in the main and primary burner passages are balanced so that the flow to the main burners is maintained at a fixed proportion to the flow to the primary burners. The system shown in FIGS. 3 and 4 relies upon flow rates and pressure drops rather than upon the actual pressures existing in the passages and thereby relies upon the flows to the main and primary burners respectively.

As above mentioned, the invention is for use in gas turbine engines of the fan type in which at the upstream end of the engine there is provided a fan 1 which is driven by the engine and which delivers air into a duct 2. The engine, as illustrated, includes a compressor 3 and two turbines 4 and 5. One of the turbines drives the compressor 3 and the other turbine the fan 1. A combustion apparatus 6 is located between the compressor and turbine stages of the engine.

Auxiliary fuel systems are used to provide fuel to the duct 2 under the control of an operator, which, in the case of aircraft, is the pilot, in order that combustion can be affected within the duct 2 for providing additional thrust. More particularly, the invention is for use in an engine of this character in which the direction of thrust can be varied and at the same time the effective area of the exhaust outlet also varied, with additional thrust being required when the exhaust outlet is directed to provide a component of lift to the aircraft.

As clearly illustrated in FIG. 1, primary and main burners 10 and 11 respectively are located in the duct 2 and this duct is generally referred to as a plenum chamber. Fuel is also supplied by the auxiliary system to burners 12 operably associated with igniters. As is customary in gas turbine engines, the primary and main burners are required to operate simultaneously so that large flow changes can be accommodated without impairing the atomization efficiency.

The system can be made operative by the pilot of the aircraft by means of a link 13 which executes the functions of opening a valve 15, admitting air under pressure obtained from the compressors to a turbine 17 of a pump 18, opening a valve 19 in a supply line from a fuel reservoir (not illustrated) in order that the fuel can reach the pump 18.

A second pilot lever 14 can be actuated when the system is operative for controlling a valve 16 in series with the valve 15 which is coupled to a different mechanism which forms no part of this invention. The movement of the lever 14 also controls a variable multiple valve 20 provided with three lands for controlling the fuel flow from the pump 18 through a servo-operated throttle valve 21 to the pipes leading to the primary, main and igniter burners 10, 11 and 12 respectively.

The fuel flow to the primary burners is controlled as a function of the pressure rise across the engine fan although other parameters could be utilized and the manner in which this is accomplished will be later more fully described. The pilot sets the lever 14 for the fuel supply which is necessary to produce the required performance but the throttle valve 21 regulates the fuel which actually reaches the burners.

In order to control the flow to the primary burners, there is provided a body 22 within which a flexible diaphragm 25 serves to define two chambers 23 and 24. To one of the chambers, the pressure of air upstream of the fan is admitted and the pressure of the air downstream of the fan is admitted to the other chamber. An evacuated capsule 26 is positioned within the chamber 23 and between the capsule 26 and a rod 27 connected to the center of the diaphragm 25 is located one end of a lever 28 pivotally mounted in the wall of the body 22 as indicated at 29. The body 22 is further provided with a chamber 30 into which the opposite end of the lever 28 extends and such end of the lever carries a half-ball 31 which is engageable with a seat 32 in the wall of the body 22 by virtue of the action of spring 33.

The seat 32 constitutes the end of a passage or conduit 34 communicating with one end of a servo cylinder 35 of the throttle valve 21. A piston 36 loaded by a spring 37 is mounted within the cylinder and is biased towards the end at which the passage 34 enters the cylinder. The piston 36 is provided with a valve head 38 and the position of the valve head controls the fuel flow rate through a pipe or conduit 39 leading from the pump 18 to the multiple valve 20. The body 22 is further formed with a cylinder 40 in which is mounted a piston 41 provided with an extension adapted to engage the lever 28 at a location between the pivot 29 and the half ball 31. The opposite end of the cylinder 40 is in communication by means of a passage or conduit 42 with the primary burners 10 and the juncture between the passage 42 and the pipe to the primary burners is downstream of a fixed restrictor 43 located in such pipe. A pressure is maintained at the burners 10 downstream of the restrictor 43 which is dependent upon the pressure rise across the fan in the engine and the half ball 31 controls the flow through the throttle valve 21 in accordance with this valve.

It is necessary not only to maintain a pressure in the primary burners 10 which is in accordance with the fan pressure rise but to translate this such that the flow to the primary burners is in the same relationship. In order to achieve such ends, the pipe to the primary burners 10 includes a pressure responsive spring loaded valve 44 which controls the flow through a variable orifice of known type in accordance with the applied pressure. As illustrated in FIG. 2, the valve 44 may be replaced by a known type of alternative burner illustrated at 45 and which is arranged to produce the same effect.

Since it is necessary that the fuel flow rate to the main burner is a function of the flow rate to the primary burners 10, this is realized by ensuring that the pressure downstream of the restrictor 43 in the pipe to the primary burners is also that in the pipe to the main burners 11. For maintaining this pressure, there is provided a device 46 having two chambers 47 and 48 divided by a flexible diaphragm 49. Into the chamber 47 at one side of the diaphragm 49, fuel at the pressure existing in the passage 42 downstream of the restrictor 43 is admitted. The other chamber 48 is in the fuel flow path between the multiple valve 20 and the main burners 11 and the pressures are maintained equal by movement of the diaphragm for determining the opening of an outlet orifice communicating with the pipe leading to the burners 11. Since the pressure drop across the fixed restrictor 43 is maintained the same as that across the orifice which is varied by the position of the diaphragm 49, the flow in the pipe to the main burners 11 will be a predetermined function of that in the pipe to the primary burners 10. The device 46 incorporates a pressure relief valve 50 between the chambers 47 and 48 for preventing damage to the diaphragm under the influence of a sudden change in pressure. The pipe leading to the main burners 11 is also equipped with a nonreturn valve 51 for maintaining pressure in the chamber 48 as well as preventing damage to the diaphragm in the event the multiple valve 20 is moved rapidly to cut off flow to the main burners. The valve 51 will also prevent back pressure in the main burners, reaching the chamber 48.

As previously mentioned, the principle of this particular control is that the pressure of the fuel flowing to the primary burners 10 is controlled in accordance with the fan inlet and outlet pressure rise. This pressure control is achieved through the passage 42 from the passage to the primary burners 10, which, together with the diaphragm 25, controls the position of the half ball 31 which in turn controls the operation of the throttle valve 21. The pressure existing in the passage to the primary burners 10 is balanced in the device 46 against the pressure in the passage to the main burners 11 and this balance controls the flow to the main burners by the control member carried by the flexible diaphragm 49.

Figure 3:
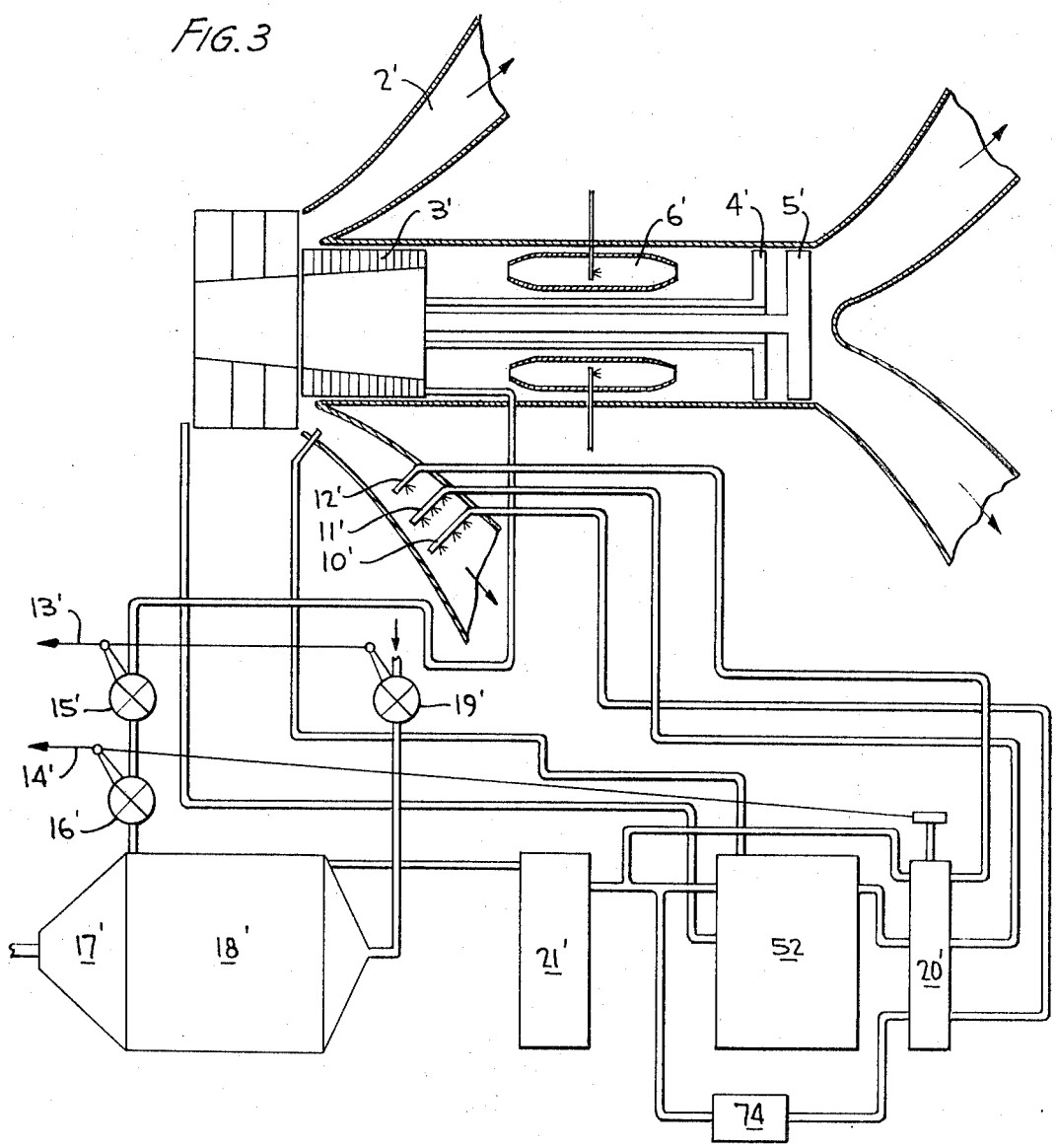
FIG. 3 is a diagrammatic view of a gas turbine engine of the fan type provided with an alternative fuel control system.

In the system illustrated in FIGS. 3 and 4, the principle is that the pressures existing in the main and primary burner passages are balanced so that the flow to the main burners is maintained at a fixed proportion to that to the primary burners. In this embodiment, parts corresponding to those illustrated in FIGS. 1 and 2 will bear similar reference numerals except they are primed. It should be mentioned that the lever 14' operates the variable multiple valve 21 which is positioned in the separate pipes to the burners 10', 11' and 12'.

The fuel supply to the burners 10' through its associated pipe or conduit is via a device denoted generally 52. The device 52 includes a cylinder 53 in which is mounted a spring loaded piston 54 having a sleevelike extension 54a provided with apertures 54b. The wall of the cylinder 53 includes an inwardly extending annulus which coacts with the extension 54a for controlling the fuel flow from a passage 55 from the pump 18' through the throttle valve 21' to a chamber 56 and thence through a pipe or conduit 61 to the pipe to the primary burners 10' via the multiple valve 20'.

The piston 54 is connected to a tension spring 57 and the opposite end of the spring 57 is attached to a lever 58 which carries a half ball 59 at one end thereof. The half-ball 59 controls the entry of fuel into the chamber 56 from a chamber provided at the end of a cylinder 53 remote from the spring 57. This chamber receives fuel through an orifice in the piston 54.

The body of the device 52 is formed with a seat 60 with which the half-ball 59 cooperates. A further passage 62 leads to a chamber 63 in which is disposed an adjustably spring-loaded piston 64 which acts against the end of a lever 65 which is pivoted at 66 within the device 52. The other end of the lever 65 carries a half-ball 67. The half-ball 67 is adapted to cooperate with a seat 68 which serves as the termination of a passage 69 which leads to the throttle valve 21'. The opposite end of the piston 64 is subject to the pressure of the fuel in the passage 55 upstream of the sleevelike extension 54a of the piston 54. This arrangement is capable of maintaining at a constant value the pressure drop across a restriction defined by the sleevelike extension 54a by varying the throttle valve 21'.

Furthermore, the lever 58 at its end remote from the half-ball 59 extends into a chamber 70 and is pivoted within the device 52 as at 71 which is in the nature of a wall dividing the chambers 56 and 70. The lever 58 engages a capsule or bellows 72 to which air at the pressure upstream of the engine fan 1' is admitted and air at the pressure downstream of the fan is introduced into the chamber 70. The pressure difference acting upon the lever 58 is balanced by the spring 57 so that the position of the piston and hence the flow to the primary burners is proportional to the pressure difference existing in the chamber 70 and the capsule 72.

The main burner 11' is fed via a pipe or conduit 73 from the throttle valve 21' and the pipe 73 incorporates a unit 74 constituted by a spring-loaded member 75 arranged so as to produce within the pipe a pressure drop equal to the constant pressure drop developed by the device 52. Any change in the pressure drop at the device 52 as a consequence of a change in the position of the throttle valve 21' will effect a similar change at the unit 74. The pressure at the main burners 11' will always be a function of that at the primary burners.

It will be appreciated that the burners per se define restrictors in the pipes and these also will be in fixed relationship to one another. The flow rates to the burners will as a result also be in the same relationship as the pressure drops in the respective flow paths.

It will be noted that the pipe leading to the ignition burners 12' is only controlled by the throttle valve 21' and the multiple valve 20' although it is arranged to cut off when relatively high flow through the valve 20' is occurring to the other burners.

By virtue of the present invention there is provided a device for controlling the fuel flow to the primary burners 10 which is responsive to pressures received from the engine fan 1' for providing a bleed which in turn controls the throttle valve 21' via the half-ball 67. The pressure drop developed by the device 52 in the primary burner passage is matched by an equal pressure drop in the main burner passage to the main burners 11' by means of the unit 74. While the unit 74 is extremely simple in structural detail, its design is such that its characteristic performance is capable of producing the same pressure drop as that developed by the device 52. Hence, this particular embodiment relies upon the flows to the main and primary burners respectively.

It is to be understood that the various components constituting the systems may be replaced by other components designed to perform equivalent functions. Moreover, the invention is also applicable to engines of other types such as the bypass type engine which is similar to the fan type except the air entering the duct is received in an axial direction from the engine compressor or compressors. Alternatively, the systems may be employed to supply fuel for reheating purposes, that is combustion which is effected in the exhaust of the engine.

We claim:

1. A fuel control system for supplying fuel to primary and main burners in a gas turbine engine, including a pump, fuel-passage-defining means providing communication between the pump and the burners respectively, a manually operable valve having portions simultaneously controlling flow to the primary and main burners respectively, a servo-operated throttle valve in the fuel-passage-defining means for controlling flow to the burners, a device to which higher and lower air pressures obtained from the engine are applied, a pressure-responsive means in said device to which said pressures are applied, a valve in said device controlled by the pressure responsive means, said valve controlling the fuel flow to the primary burners, a second valve in said device arranged for controlling the pressure of fuel to the servo-operated throttle valve for controlling the fuel flow therethrough, means responsive to the pressure of fuel flowing to the primary burners, said last named means being arranged to actuate said second valve, and a device in the passage-defining means to the main burners arranged for controlling the fuel flow to the main burners at a rate proportional to that to the primary burners, said last named device comprising a valve arranged for creating a pressure drop in said passage-defining means, and said device and valve controlled by the higher and lower air pressures for controlling flow of fuel to the primary burners being arranged for creating equal pressure drops.

2. A fuel control system for supplying fuel to primary and main burners in a gas turbine engine, comprising a pump, a turbine for driving the pump, a passage in which the turbine is positioned, said passage communicating with the engine for receiving a supply of air therefrom for driving the turbine, a manual control valve in the passage between the engine and the turbine, fuel passage means providing communication between the pump and the burners in the engine respectively, a manually operable valve having portions simultaneously controlling flow to the primary and main burners respectively, a servo-operated throttle valve in the fuel passage means controlling flow to the burners, a device to which higher and lower air pressures obtained from the engine are applied, a pressure-responsive means in said device to which said pressures are applied, a valve in said device controlled by said pressure-responsive means for controlling the fuel flow to the primary burners, a second valve in said device for controlling the pressure of fuel to the servo-operated throttle valve for controlling the fuel flow therethrough, means responsive to the pressure of fuel flowing to the primary burners, said last name means being arranged for actuating said second valve, and a device in the passage to the main burners arranged for controlling the fuel flow to the main burners at a rate proportional to that to the primary burners.

3. A fuel control system for use with a gas turbine engine of the type having a fan driven by the engine and a duct through which air delivered by the fan can flow, primary and main burners in the duct, said system including a pump, fuel passage defining means providing communication between the pump and the burners in the engine respectively, a manually operable valve having portions simultaneously controlling flow to the primary and main burners respectively, a servo-operated throttle valve in the fuel-passage-defining means for controlling flow to the burners, a device to which higher and lower air pressures obtained from the engine are applied, a pressure-responsive means in said device to which said pressures are applied, a valve in said device controlled by said pressure-responsive means controlling the fuel flow to the primary burners, a second valve in said device for controlling the pressure of fuel to the servo-operated throttle valve for controlling fuel flow therethrough, means responsive to the pressure of fuel flowing to the primary burners arranged for actuating said second valve, and a device in the fuel passage defining means for controlling the fuel flow to the main burners at a rate proportional to that to the primary burners.

4. A fuel control system for use with a gas turbine engine of the type having a fan driven by the engine and a duct through which air delivered by the fan can flow, primary and main burners in the duct, said system including a pump, fuel-passage-defining means providing communication between the pump and the burners in the engine respectively, a manually operable valve having portions simultaneously controlling flow to the primary and main burners respectively, a servo-operated throttle valve in the fuel-passage-defining means for controlling flow to the burners, a device to which higher and lower air pressures obtained from the engine are applied, a pressure-responsive means in said device to which said pressures are applied, a valve in said device controlled by said pressure-responsive means controlling the fuel flow to the primary burners, a second valve in said device for controlling the pressure of fuel to the servo-operated throttle valve for controlling fuel flow therethrough, means responsive to the pressure of the fuel flowing to the primary burners arranged for actuating said second valve, and a device in the fuel passage defining means for controlling the fuel flow to the main burners at a rate proportional to that to the primary burners, the valve for controlling the fuel flow to the primary burners including a piston, the position of which is determined by the pressure of fuel flowing through the valve on one side and by the pressure of fuel controlled by a further valve on the other side, and said further valve being controlled in turn by the pressure-responsive means to which the air pressures are applied.

* * * * *